United States Patent [19]

Hedstrom et al.

[11] Patent Number: 5,186,291
[45] Date of Patent: Feb. 16, 1993

[54] TRANSMISSION FOR A VEHICLE

[75] Inventors: Lars-Gunnar Hedstrom, Vagnhärad; Björn Westman, Huddinge, both of Sweden

[73] Assignee: Saab-Scania Aktiebolag, Sweden

[21] Appl. No.: 768,722

[22] PCT Filed: Feb. 8, 1991

[86] PCT No.: PCT/SE91/00083
§ 371 Date: Oct. 8, 1991
§ 102(e) Date: Oct. 8, 1991

[87] PCT Pub. No.: WO91/12443
PCT Pub. Date: Aug. 22, 1991

[30] Foreign Application Priority Data

Feb. 9, 1990 [SE] Sweden ................. 9000467

[51] Int. Cl.$^5$ .................. F16H 47/06; B60K 17/06
[52] U.S. Cl. .................. 192/3.23; 192/4 A; 475/45; 74/336 R
[58] Field of Search .............. 192/3.34, 3.23, 4 A; 475/36, 42, 43, 45, 59, 60, 67, 68; 74/731.1, 732.1, 336 R; 364/424.1

[56] References Cited

U.S. PATENT DOCUMENTS

| 2,084,219 | 6/1937 | Salerni ................. 192/4 A |
| 2,414,359 | 1/1947 | Carnuagua et al. ........ 475/45 X |
| 3,367,211 | 2/1968 | Borman ................. 475/45 |
| 3,667,309 | 6/1972 | Franz et al. ............ 192/4 A X |
| 3,670,596 | 6/1972 | Hause .................. 74/732.1 X |
| 3,715,017 | 2/1973 | Jenney ................. 192/4 A |
| 3,834,499 | 9/1974 | Candellero et al. ....... 192/4 A |
| 4,077,502 | 3/1978 | Nitsche et al. .......... 192/4 B |

FOREIGN PATENT DOCUMENTS

| 2021543 | 11/1971 | Fed. Rep. of Germany . |
| 3627370 | 11/1988 | Fed. Rep. of Germany . |
| 2193766 | 2/1988 | United Kingdom . |

Primary Examiner—Leslie A. Braun
Assistant Examiner—Khoi A. Ta
Attorney, Agent, or Firm—Ostrolenk, Faber, Gerb & Soffen

[57] ABSTRACT

A transmission for a vehicle comprises a mechanical stepped gearbox (6) in front of which a hydraulic torque converter (5) is arranged. The torque converter (5) comprises a turbine wheel (19) which is connected to a turbine shaft (21). An input shaft (25) of the gearbox (6) is connected in a drive power-transmitting manner to the turbine shaft (21). In addition, a brake (34) is connected to the turbine shaft (21) or the input shaft (25), in which respect, on starting-up, the input shaft (25) can be stopped in order to permit engagement of a starting gear without the need to produce drive power interruption by means of a conventional clutch. The brake (34) is also used when changing-up for synchronization of the gearbox (6) together with an electrical control unit (32) for engine regulation. This allows the gear-changing in a mechanical, unsynchronized stepped gearbox to be carried out in a simple manner.

26 Claims, 4 Drawing Sheets

TRANSMISSION FOR A VEHICLE

The present invention relates to a transmission for a vehicle and a method for regulating a transmission.

PRIOR ART

Transmissions for use in vehicles generally comprise a gearbox of some type or another in order to permit driving under varying conditions. Various main types of gearboxes are known. One type consists of hydraulic gearboxes incorporating a hydraulic torque converter coupled in series to a gearbox comprising a number of planetary gears. The advantages of this type of gear box are that the regulation is effected automatically, the gear-changing can take place without drive power interruption, and the driver does not have to manoeuvre any clutch. In addition, on starting, the driver can easily regulate the desired drive torque by means of regulating only the accelerator pedal and, moreover, a high starting torque is obtained. The disadvantages are that these gearboxes are relatively complicated and therefore also expensive. Furthermore, they exhibit relatively high energy losses.

Another type of gearbox consists of a mechanical stepped gearbox. In this type of gear box, there are arranged, on parallel shafts, a number of pairs of gear wheels which, by means of selective engagement provide different gear ratios. When changing gear, the driver usually has to operate a clutch manually in order to produce a drive power interruption from the vehicle engine. This type of gearbox exhibits relatively small friction losses and it is considerably cheaper to manufacture than a hydraulic gearbox of the type described above.

In addition to these two main types of gearboxes, there are other variants of the same. For the purpose of improving the starting torque especially in heavy vehicles, it is known, in the case of stepped gearboxes, to arrange a hydraulic torque converter between a drive engine and a clutch. Such a construction means that the clutch is also exposed to high torques when the torque converter is engaged. The clutch is not usually dimensioned for these high torques, with the consequence that it should not be manoeuvred when the torque converter is engaged. The result of this is that such a transmission requires a special mode of driving and requires that the driver be trained for this, since otherwise the clutch plate risks being overloaded.

Another alternative transmission is described in British Patent Specification GB-A-2,193,766. In this transmission, a hydraulic torque converter is coupled together with a stepped gearbox. The torque converter is connected to a drive engine via two separate clutch plates. Upon activation of the one clutch plate, all the drive power is transmitted from the drive engine via the torque converter to the stepped gearbox. Upon activation of the other clutch plate, all the drive power is transmitted from the drive engine via a free wheel directly to the stepped gearbox. This transmission functions such that, upon starting-up and with the vehicle stationary, both the clutch plates are disengaged in order to produce a drive power interruption and to permit manoeuvring of the stepped gearbox so that a starting gear can be engaged. Thereafter, the one clutch plate is activated, by which means the torque converter is engaged and drive power is transmitted from the engine to the output shaft of the gearbox. When the vehicle has reached a certain speed, the first clutch plate is disengaged and the second clutch plate is activated instead, by which means the drive power is transmitted directly from the engine to the input shaft of the gearbox. Upon continued increase of speed, the stepped gearbox can be shifted after a certain time, this taking place with the aid of different clutches in the gearbox. When the vehicle has come to a halt, it is necessary to interrupt the drive power connection, which is effected by disengaging the clutch plate in question. In order to permit gear-changing during travel, it is necessary to control the engine speed in a suitable manner in order to produce or at least facilitate synchronisation before a new gear can be engaged.

American Patent Specification U.S. Pat. No. 3,834,499 illustrates a mechanical gearbox which is connected via a conventional clutch to a drive engine. The gearbox comprises an electronic synchronisation arrangement which, inter alia, regulates the engine speed before a change of gear. For the purpose of speeding up the synchronisation, this arrangement also comprises a brake which permits rapid reduction in the speed of the input shaft of the gearbox.

AIM OF THE INVENTION

The present invention aims to produce a new type of transmission primarily intended for use in heavy vehicles such as lorries, which combines the advantages of known types but which does not exhibit their respective disadvantages. More specifically, the aim is to produce an automatic transmission which does not require the driver to operate any clutch when changing gear, which can provide a high and easily controllable torque at least when starting-up, and which allows a number of gears to be selected so that the engine will be able to be driven around an optimum engine speed. Furthermore, the aim is to reduce the friction losses via the transmission and to design the transmission in a simple manner and at a relatively low cost.

BRIEF DESCRIPTION OF THE INVENTION

According to the invention, by arranging a brake which can firmly lock the input shaft of the gearbox, it is possible for gear engagement to be carried out upon starting-up, even when the drive engine of the vehicle is running, without the need to use conventional friction coupling for drive power interruption. According to an advantageous embodiment of the invention, no mechanical clutch is therefore required for producing drive power interruption between the shafts during gear-changing. In this way, it has been possible for the regulation of a mechanical gearbox to be automated by simple means.

According to a further advantageous embodiment of the invention, by arranging a planetary gear in front of the torque converter, it is possible to divide the drive torque up so that only part of the overall drive torque is transmitted via the torque converter. This means that the load on the torque converter is relatively small. This in turn means that it is possible to accelerate the vehicle to a relatively high speed from start-up before the stepped gearbox needs to be shifted. For reasons of fuel economy, modern diesel engines for use in heavy vehicles are designed so as to be driven at a relatively low engine speed and are furthermore often designed so as to be driven optimally within a narrow range of speed. The advantageously arranged planetary gear means that the speed is changed up before the torque converter, which thereby improves the preconditions for the torque converter being driven optimally in spite of a low engine speed. A method for regulating a transmission according to the invention is also described. Further advantages and features characterising the invention will emerge from the subsequent description of an exemplary embodiment of the invention.

DESCRIPTION OF THE DRAWINGS

In the description, reference is made to the attached drawings in which.

DESCRIPTION OF AN EXEMPLARY EMBODIMENT

Figure 1:
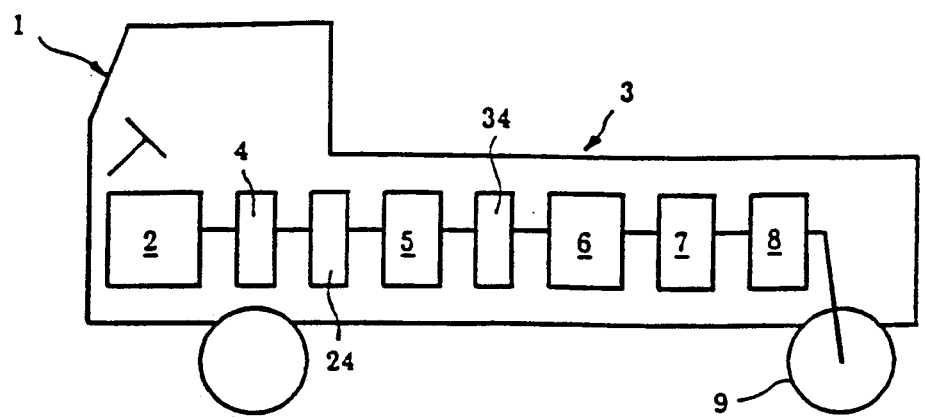
FIG. 1 shows diagrammatically a vehicle with a transmission according to the invention.

Attached FIG. 1 shows diagrammatically a vehicle 1 in the form of a lorry. However, the invention is applicable to all types of vehicles, both heavy vehicles, such as lorries and buses, and lighter vehicles, such as passenger cars. The vehicle 1 comprises a drive engine 2, expediently an internal combustion engine, which transmits drive power to the drive wheels 9 of the vehicle via a transmission 3. The transmission 3 comprises the following main units, in order from the engine: namely a planetary gear 4, a hydraulic torque converter 5, a stepped gearbox 6, a hydraulic retarder 7, and a bevel gear 8 which finally transmits the drive power to the drive wheels 9. These units are connected to each other in a conventional manner via a number of shafts and in a way which will emerge more clearly from the description which follows.

Figure 2:
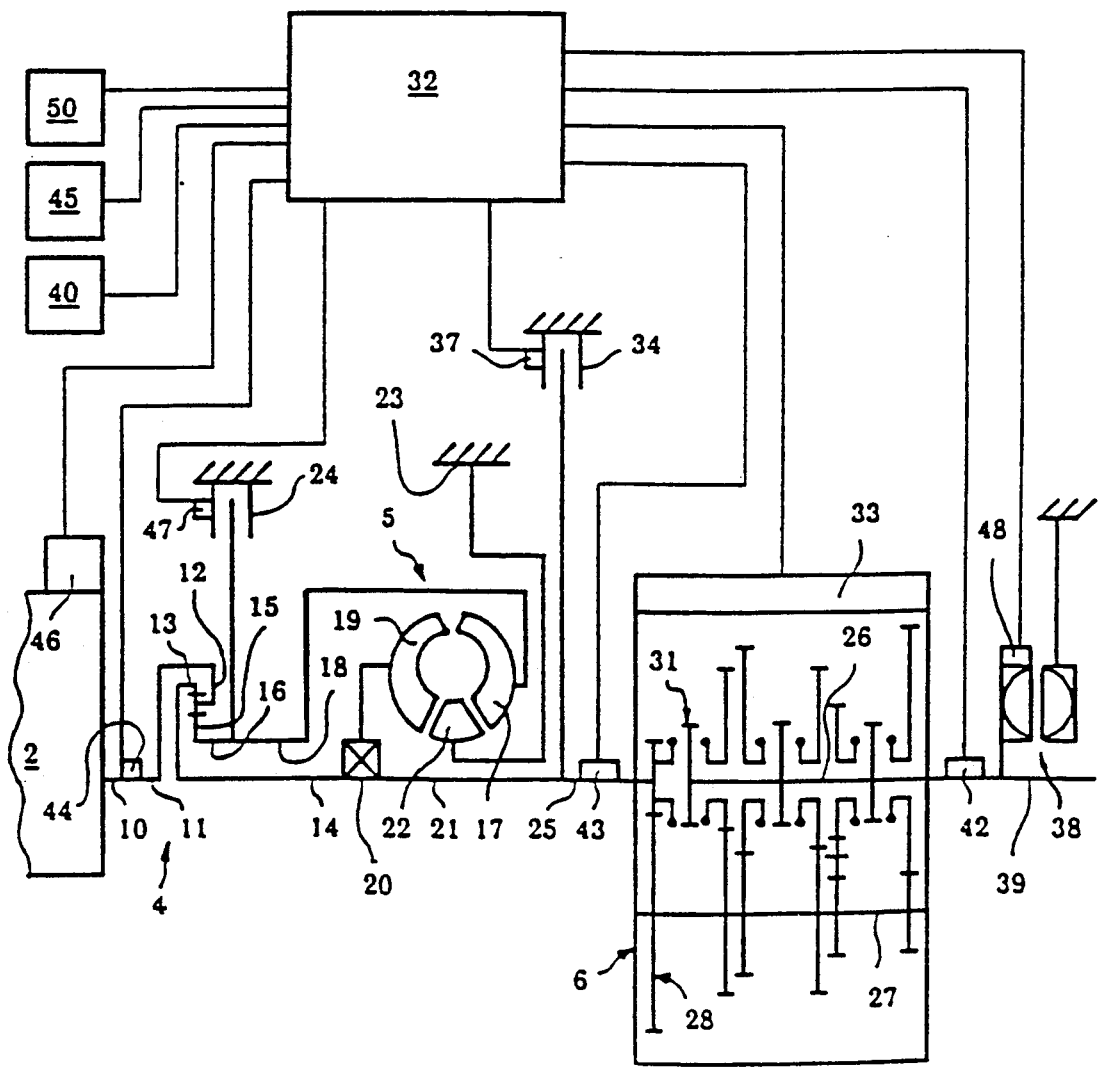
FIG. 2 shows diagrammatically the transmission according to FIG. 1.

Attached FIG. 2 shows a more detailed but nevertheless diagrammatic representation of those parts of the transmission 3 according to FIG. 1 which are essential to the present invention. The engine 2 is shown in FIG. 2 with an output shaft 10 which in the engine 2 is connected to its crankshaft and its flywheel (not shown) via a resilient carrier. This carrier is an elastic transfer element for compensating for the pulsating vibrations of the crankshaft caused by the different ignition times for the different cylinders of the engine. The carrier ensures that the output shaft 10 rotates evenly and without pulsations which would otherwise cause noise in subsequent gearwheel transmissions. Since resilient carriers are well known per se in conjunction with vehicle transmissions they will not be described herein. The planetary gear 4 comprises an input shaft 11 which is connected at one end to the output shaft 10 of the engine 2 and is connected at the other end to a planetary wheel holder 12. The planetary gear 4 furthermore comprises a ring wheel 13 connected to a first output shaft 14 of the planetary gear 4 and a sun wheel 15 connected to a second output shaft 16 of the planetary gear 4. The second output shaft 16 of the planetary gear 4 is advantageously designed as a tubular shaft which is arranged around the first output shaft 14 of the planetary gear 4. The planetary gear 4 is not in itself necessary for utilising the present invention, but is should be included in an advantageous embodiment, since it affords great advantages as will emerge from the description which follows.

The hydraulic torque converter 5 comprises an impeller 17 connected to an input shaft 18, hereinafter called the pump shaft 18. The torque converter 5 also comprises a turbine wheel 19 which is connected, via a free wheel 20, to an output shaft 21, hereinafter called the turbine shaft 21. In this case, the free wheel 20 is arranged in such a way that only drive power in the normal direction of rotation of the engine 2 can be transmitted from the turbine wheel 19 to the turbine shaft 21. The torque converter 5 moreover comprises a stator 22 firmly connected to the housing 23 of the torque converter 5 in a conventional manner. Arranged between the planetary gear 4 and the torque converter 5 is a brake 24 which is connected to the second output shaft 16 of the planetary gear 4 and can thus also be regarded as firmly connected to the pump shaft 18 of the torque converter 5. The brake 24 is used in a high gear position of the planetary gear 4, when the brake 24 is activated and firmly locks the sun wheel 15 of the planetary gear 4. All the torque is thus transmitted mechanically from the input shaft 11 of the planetary gear 4 to its first output shaft 14. In a low gear position of the planetary gear 4, on the other hand, the brake 24 is not activated, in which respect the torque is divided up in the planetary gear 4 (which then acts as a differential gear) into a part which is transmitted to the first output shaft 14 and a part which is transmitted to the second output shaft 16. In the latter case, part of the torque is transmitted to the pump shaft 18 of the torque converter 5, then via the torque converter 5 and further via the free wheel 20 to the turbine shaft 21. In this way, part of the torque from the engine 2 is thus transmitted mechanically to the turbine shaft 21 and the other part of the torque is transmitted hydraulically to the turbine shaft 21.

The stepped gearbox 6 comprises an input shaft 25, a main shaft 26 and a side shaft 27, which shafts 25, 26, 27 are parallel with each other and bear different cooperating gear wheel pairs 28 for forming different gear ratios. A reverse gear wheel arranged on a reverse shaft makes it possible in a conventional manner for the direction of rotation to be changed on the main shaft 26, and similarly the output shaft of the gearbox 6. The illustrated gearbox 6 comprises six pairs of gear wheels 28, of which one pair cooperates with the reverse gear. The gearbox 6 therefore has five gear positions for forward drive and one gear position for reverse drive. The gearbox 6 comprises a number of clutches 31 by means of which the respective gear wheel pairs 28 can be selectively engaged in order to form the different gear ratios. The clutches 31 comprise clutch halves for stable coupling together with each other. The clutches 31 are operated automatically under the action of a control unit 32 via servo members 33. The gearbox 6 is therefore a sideshaft gearbox which is automatically controlled by the control unit 32. The servo members 33 can advantageously consist of hydraulic or pneumatic piston-cylinder units which act on shifter forks in the gearbox 6. As will emerge from the description, this means that the gearbox 6 can be of the so-called unsynchronised type, by which is meant here that the respective clutches 31 are without individual synchronisation members.

Characteristic of the illustrated arrangement, which represents an advantageous embodiment, is the fact that the input shaft 25 of the gearbox is firmly connected to the turbine shaft 21 and that the transmission 3 has no mechanical clutch for producing drive power interruption between the engine 2 and the gearbox 6 during changing in the gearbox 6 and on engagement of the starting gear. In an alternative embodiment, however, the arrangement can also comprise a conventional clutch, for example in the form of a friction clutch between the input shaft 25 of the gearbox and the turbine shaft 21.

In alternative embodiments, the stepped gearbox can comprise a number of side shafts. The stepped gearbox can also be based on entirely different types of gearboxes, in which the different gears can be selectively engaged by means of dimensionally fixed clutch elements.

Arranged between the gearbox 6 and the torque converter 5 is a brake 34. This is designed as a disc brake with a number of discs arranged on and firmly connected to the input shaft 25 of the gearbox 6 and with a number of rotationally-fixed discs. An electrically actuable servo member 37 is designed, upon activation, to convey hydraulic oil to the brake 34 in order thereby to create a brake pressure. The servo member 37 is electrically connected to the electrical control unit 32 for control of the same in accordance with what is described in greater detail below.

In an alternative embodiment, the brake 34 can instead be mounted on a side shaft which is connected in a drive power-transmitting manner to the input shaft 25 or the turbine shaft 21.

Arranged on the output shaft 26 of the gearbox is a brake designed as a hydrodynamic retarder 38 which, upon activation, brakes the output shaft 26 in a conventional manner. The hydraulic system which is required for the retarder 38 can advantageously be combined with that which is required for the torque converter 5. However, since these hydraulic systems can be regarded as being of conventional construction and since it is not necessary to know their detailed design for an understanding of the present invention, they are not included in the description.

The output shaft 26 of the gearbox 6 is moreover connected in a conventional manner via a cardan shaft 39 to the bevel gear 8 for onward transfer of drive power to the drive wheels 9 of the vehicle 1. This part too of the transmission 3 is of conventional design.

Figure 5:
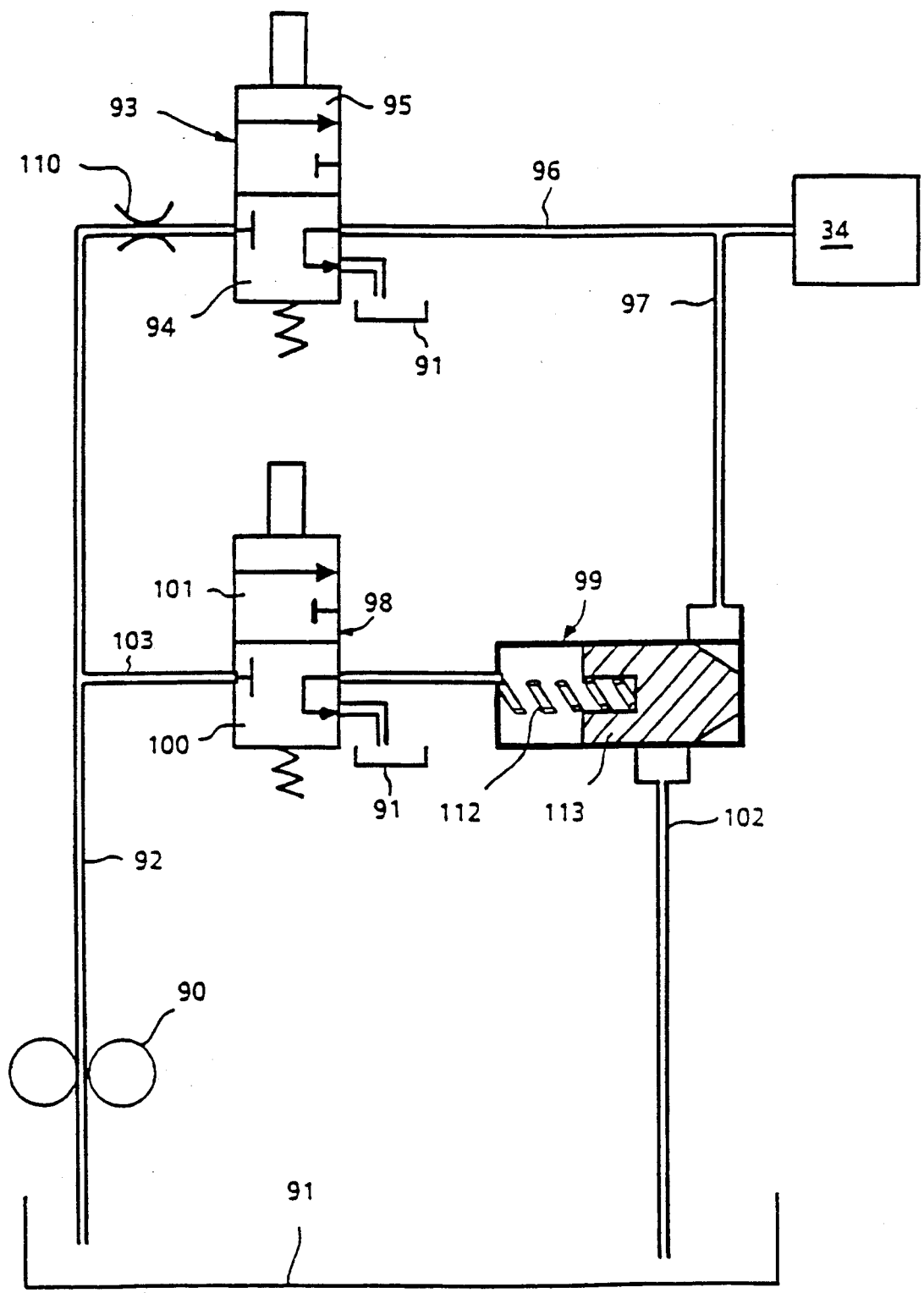
FIG. 5 shows a hydraulic coupling circuit for regulating a brake included in the transmission.

FIG. 5 shows a schematic drawing of the hydraulic regulating system of the brake 34 according to an advantageous embodiment, which system can be regarded as forming part of the servo member 37. An oil pump 90 draws from a sump 91 hydraulic oil which is pumped out into a feed line 92 and via a throttle 110 to a first solenoid valve 93. The valve 93 is closed in a spring-loaded rest position 94. The valve 93 is electrically connected to and controlled by the control unit 32 and, upon activation, the valve 93 assumes an open position 95, and the hydraulic oil is conveyed further to a brake line 96 directly connected to the turbine brake 34. Also coupled to the brake line 96 is a branch line 97 which is connected to a pressure-regulating valve 99. This is also connected to the sump 91 via a return line 102. The pressure-regulating valve is also connected to the feed line 92 via a line 103, which line 103 comprises a second solenoid valve 98. This valve has a spring-loaded closed rest position 100 and an open activated position 101. The second solenoid valve 98 too is connected to the control unit 32 and is activated by the latter.

The pressure-regulating valve 99 comprises a pressure-regulating piston 113, which regulates the flow of oil from the branch line 97 to the return line 102, in order thereby also to regulate the pressure at which the oil is conveyed to the brake 34. The piston 113 is shown in FIG. 5 in a closed position, in which the piston 113 is displaced towards its right-hand end position under the action of a compression spring 112.

The function of the hydraulic regulating system is as follows. In the position of the valves 93, 98 and 99 as shown in FIG. 5, oil is drained from the brake to the sump 91, and the brake is therefore not activated. Upon activation of the first valve 93, on the other hand, the brake is supplied with oil, which is thus pressurised. However, oil is also conveyed via the branch line 97 to the pressure-regulating valve 99, in which it acts on the right-hand side of the regulating piston 113 and displaces the piston 113 to an open position, counter to the action of the spring 112. Oil from the brake line 96 is thus conveyed on to the return line 102 and onwards to the sump 91. This means that the oil pressure conveyed to the brake 34 can only reach a relatively low value. The compression spring 112 and the design of the piston 113 are dimensioned so as to limit the oil pressure which can be maintained in the brake line 96 to a low pressure. This pressure is too low for the brake 34 to be able to carry out any braking work. On the other hand, this pressure is sufficient for the discs in the brake 34 to be placed against each other and for play to be taken up.

Upon activation of the second solenoid valve 98 too, oil is conveyed again from the feed line 92 to the pressure-regulating valve 99, in which the oil acts on the left-hand side of the piston 113. In addition, as before, oil is conveyed via the branch line 97 to the right-hand side of the piston 113. The oil pressures acting on both sides of the piston 113 are even and balance each other. Under the action of the spring 112, the piston 113 is displaced towards its right-hand closed position. The connection between the branch line 97 and the return line 102 is thus interrupted. The pressure which the oil reaches in the brake line 96 thus comes to attain a high value which is limited only by the pressure which the pump 90 is able to provide. This pressure is dimensioned sufficiently high for the discs in the brake 34 to be placed against each other and to carry out braking work. It is assumed that the oil pump 90 itself comprises members regulating the maximum pressure which the pump 90 is able to provide, which pressure is identical to the maximum pressure which can be conveyed to the brake 34. It is also assumed that the pump 90 comprises members which protect the pump against overloading in the case where both solenoid valves 93 and 98 are closed.

The following are given as examples of suitable low and high oil pressures which can occur in the closed and open positions, respectively, of the regulating piston 113. The low pressure which is used for bringing the discs together should be lower than 1 bar, but advantageously less than 0.5 bar. According to an advantageous embodiment, this pressure is chosen at about 0.2 bar. The high pressure which is used for applying the brake in such a way that it carries out braking work should be at least a power of 10 higher than the low pressure, and advantageously about 200% or more higher. When the brake is to carry out braking work, the brake pressure is in itself of less interest. The essential point is that the brake is able to generate a certain desired braking torque. This braking torque must be sufficiently high to be able to hold completely the input shaft 25 of the gearbox 6 when the drive engine 2 is idling and the torque converter 5 is at least partially filled with oil. In the case of a heavy lorry, the brake 34 should be dimensioned to generate a braking torque of at least about 2,000 Nm. With suitable dimensioning of the brake 34, it should be possible to obtain this braking torque at a brake pressure of about 5 bar, which thus corresponds to the high oil pressure which is mentioned above. With this dimensioning, the low oil pressure of 0.2 bar corresponds to a braking torque of about 80 Nm. This braking torque should advantageously be less than 100 Nm, which it therefore is.

In an advantageous embodiment of the hydraulic system shown in FIG. 5, the second solenoid valve 98 can be designed as a proportional valve by means of which the pressure conveyed to the left-hand side of the regulating piston 113 can be continuously regulated. Such a proportional valve can have the same basic construction as the valve 98 illustrated, but the activation is effected by means of signals in the form of pulses. By virtue of the fact that the pressure on the left-hand side of the regulating piston 113 can be regulated in this way, the pressure which is conveyed to the brake can also be regulated continuously. This can be of value in more developed embodiments of the invention. The proportional valve can of course be designed in other ways well known per se. In simpler forms of the invention, however, the application of the brake 34 does not need to take place in several steps, but instead can take place in a single step.

As has emerged from the above, a number of the units of the transmission 3 are connected to the control unit 32. This is based on a microprocessor. The control unit 32 is electrically connected to a number of sensors for detecting different vehicle states. Of these sensors, one sensor 40 arranged on the brake pedal of the vehicle is used for detecting a braking state, one sensor is used both for detecting the speed of the vehicle 1 and for detecting when the vehicle 1 is stationary, one sensor 44 for detecting the rotational speed of the output shaft 10 of the engine 2, one sensor 43 for detecting the rotational speed of the input shaft 25 of the gearbox 6, and one sensor 42 for detecting the rotational speed of the output shaft 26 of the gearbox 6. In practice, the last-mentioned sensor 42 can be the same sensor as detects the vehicle speed. There is also a sensor 45 on the accelerator pedal of the vehicle, which emits a signal representing a drive torque desired by the driver. Several of the sensors can consist of existing vehicle sensors intended to be used also for other purposes in the vehicle.

There is in addition a drive mode selector which is connected to the control unit 32 and is actuated manually by the driver. By means of the drive mode selector, the driver can select at least one forward drive mode D, one reverse drive mode R and a neutral position N. Upon engagement of the forward drive mode D, there is an automatic selection of gear and an automatic shifting of the gearbox 6. In alternative embodiments, the drive mode selector can in addition be designed for manual gear selection and gear-changing. In these cases, the control unit 32 also comprises checking members which check whether the gear selected by the driver and whether the gear-changing desired by the driver are feasible with regard to the actual driving conditions. The drive mode selector comprises a sensor 50 detecting which mode the driver has selected, this sensor 50 being connected to the control unit 32.

The control unit 32 is moreover connected to sensors (not shown in FIG. 2) detecting the rotational speed of the pump shaft 18, which gear position has been engaged in the gearbox 6, which torque the engine 2 is providing, and sensors which detect whether the brakes 24, 34 and 38 in the planetary gear 4, on the turbine shaft 21 and on the output shaft of the gearbox 6, respectively, are activated or not.

The control unit 32 emits output signals to different servo members for activating different units in the transmission 3, as emerged from the above description. In addition, the control unit 32 is also connected to an engine control unit 46 by means of which the engine 2 can be regulated. If the engine 2 consists of a diesel engine, the engine control unit 46 is advantageously designed to regulate the fuel injection quantity, by which means the speed of the engine 2 can be regulated. In the case where the engine 2 consists of an Otto engine, fuel injection can again be regulated, but it is also possible, at least within certain areas, to control the ignition system of the engine for speed-regulating purposes. However, the engine control unit 46 should advantageously be of a relatively accurate type, allowing the engine speed to be regulated with great accuracy. During normal driving, the control unit 32 uses signals from the accelerator sensor 45 in order to control the engine 2. The vehicle 1 is thus provided with electric accelerator control, so-called electric accelerator, which means that the engine can be controlled regardless of the driver's accelerator pedal position. Since such electrical engine-regulating systems are well known per se, they too are not dealt with in the description.

The control unit 32 is also designed to regulate, via a servomember 47, the activation of the brake 24 of the planetary gear 4, the servo member 37 for regulating the brake 34 on the turbine shaft 21, a servo member 48 for regulating the retarder 38 on the output shaft 26 of the gearbox 6, and servo members and regulating members (not shown) included in the hydraulic system of the torque converter 5 for regulating the oil supply and oil pressure in the torque converter 5. This system does not form part of the present invention either and is therefore not dealt with further in the description.

Figure 3:
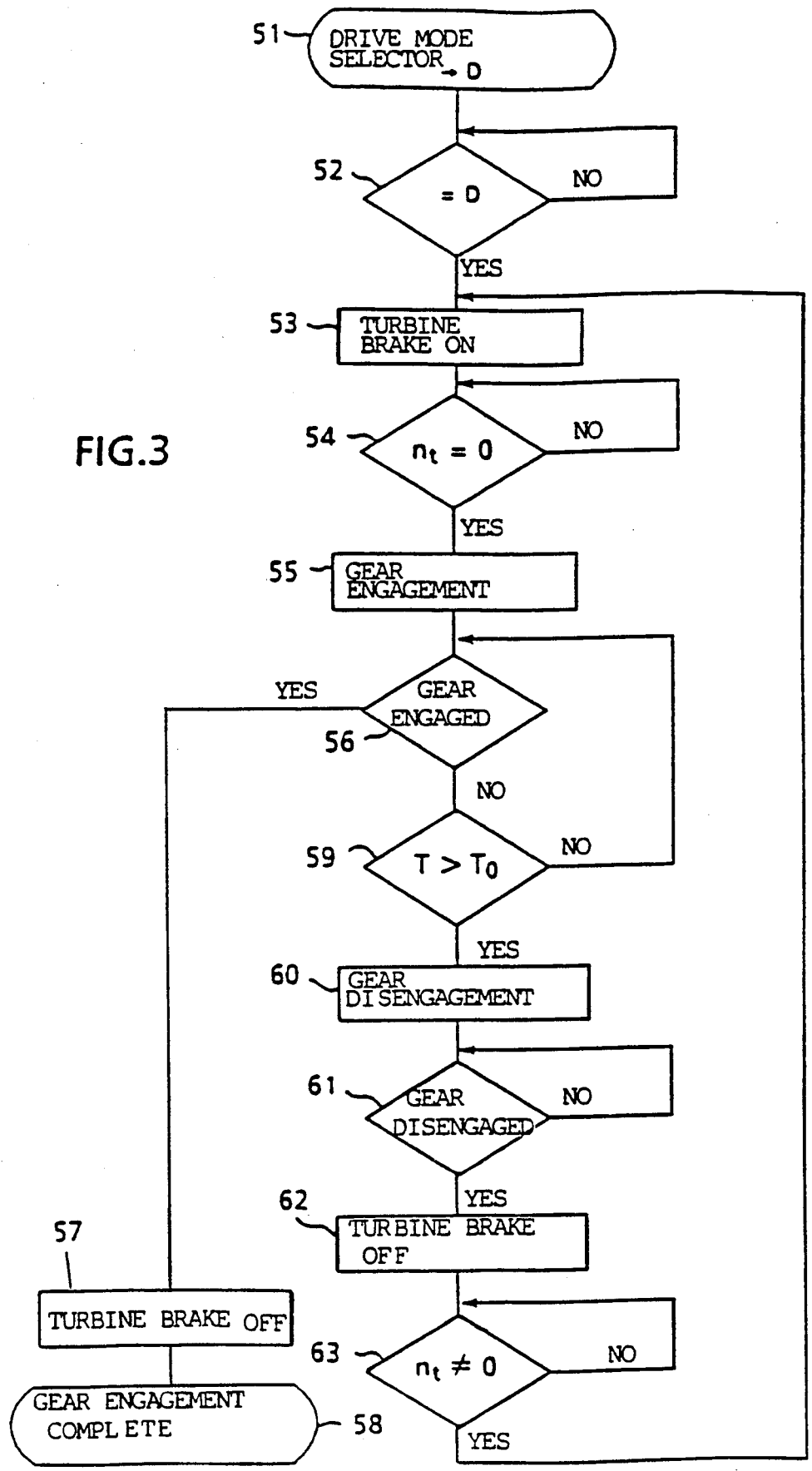
FIG. 3 shows a flow diagram of a method according to the invention for engagement of a starting gear.
Figure 4:
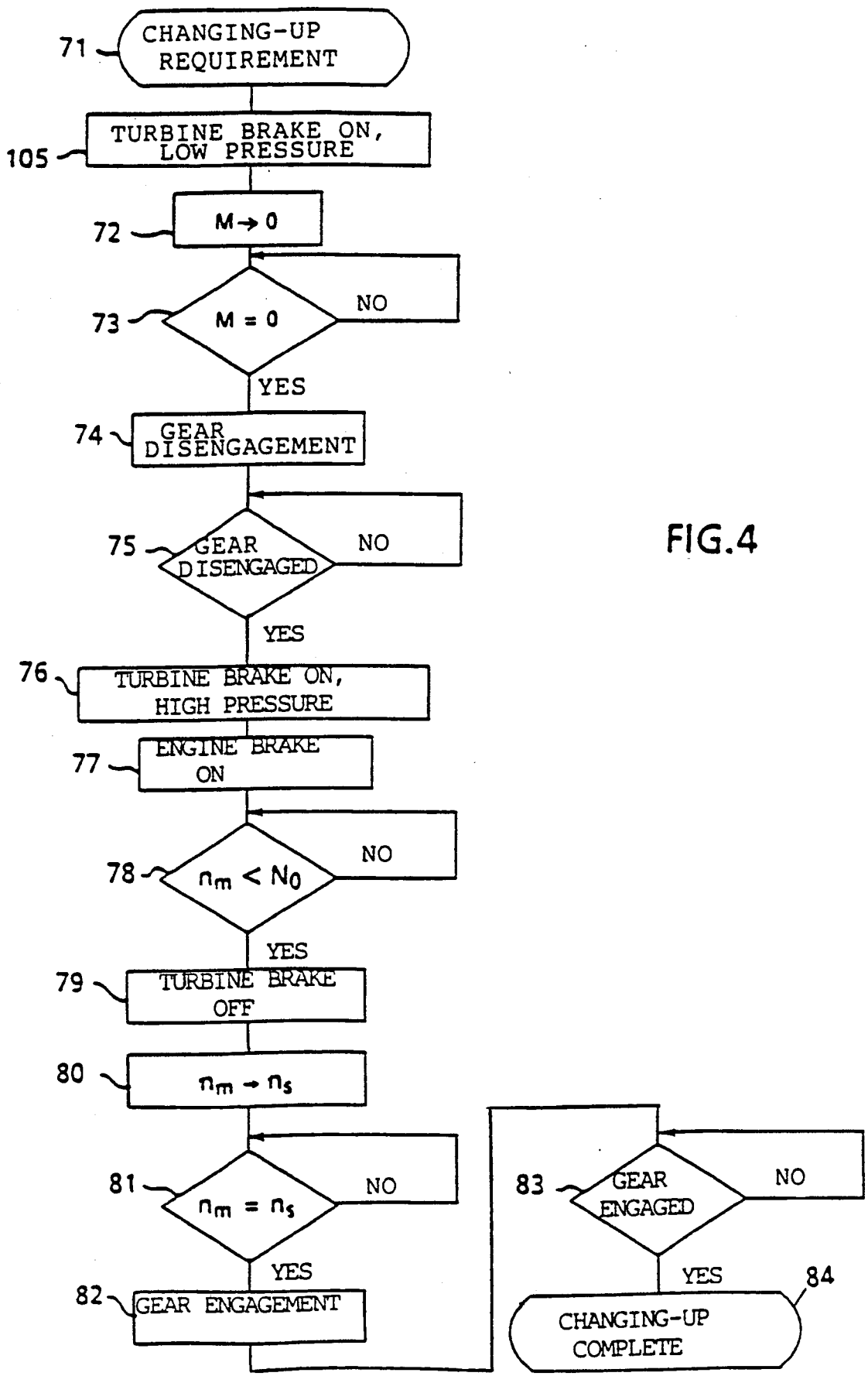
FIG. 4 shows a flow diagram of a method for changing up to higher gears.

The function of the described transmission 3 and a method for starting, gear-shifting and driving a vehicle 1 with such a transmission 3 are described hereinbelow, with reference to the flow diagrams shown in FIGS. 3 and 4. Of these, FIG. 3 shows how a starting gear is engaged, and FIG. 4 shows how changing-up is effected in the gearbox 6.

The vehicle 1 is assumed initially to be stationary, with the engine 2 in an idling position and its output shaft 10 rotating. The planetary gear brake 24 is assumed to be disengaged so that the sun wheel 15 of the planetary gear 4 is rotating, i.e. the planetary gear 4 has its low-gear range engaged. The brake 34 on the turbine shaft 21 is assumed to be disengaged. The gearbox 6 is assumed to be in a neutral position, so that it produces a drive power interruption. The output shaft 26 of the gearbox 6 is assumed, like the drive wheels 9, to be stationary. It is also assumed that the control unit 32 has detected these states. When the driver wishes to start driving the vehicle forwards, he activates the drive mode selector 50 by moving a manoeuvring column on the latter from the neutral position N to the drive position D. In FIG. 3, this is illustrated by an initial step 51.

In a second step 52, a check is made as to whether the drive mode selector has selected the drive mode D, using the sensor 50 provided for this purpose. If this has taken place, this sensor 50 emits a signal to the control unit 32 to activate the servo members 37 on the brake 34, hereinafter called the turbine brake, so that the latter brakes and locks the turbine shaft 21. This is achieved by means of both solenoid valves 93 and 98 being activated, with the result that oil under high pressure is conveyed to the turbine brake 34. This is illustrated in FIG. 3 by a third step 53. If, for any reason, the sensor 50 on the drive mode selector should not detect engagement of drive mode D, nothing happens until this has taken place. In a fourth step 54, the speed $n_t$ of the turbine shaft 21 is detected by means of the sensor 43. If the sensor 43 detects that the speed $n_t$ is equal to zero, the control unit 32 emits a signal to the servo members 33 on the gearbox 6 to engage a gear. This is illustrated by a fifth step 55 in FIG. 3. This gear is a starting gear and, moreover, the first gear position of the gearbox 6 for forward drive. If the sensor 43 does not detect that the speed of the turbine shaft 21 is equal to zero, the control unit 32 does not emit any signal for gear engagement.

As already mentioned, the gearbox includes sensors detecting which gear position 6 has been engaged, and also a sensor detecting when the neutral position of the gearbox 6 is engaged. In a simpler embodiment, the last-mentioned sensor can be omitted, and instead the first-mentioned sensors are used for detecting whether the neutral position is engaged. The absence of any detection of a gear being engaged is thus used for detecting that the neutral position is engaged. If the sensor in question detects that the gear position in question is engaged, the gear engagement is complete, illustrated in FIG. 3 by a sixth step 56. The whole procedure for gear engagement is thus complete, and the control unit 32 emits signals to release the turbine brake 34 in a seventh step 57. This is achieved by virtue of the fact that the activation of the solenoid valves 93 and 98 by the control unit 32 ceases, with the result that the feed of oil to the turbine brake 34 ceases and, instead, oil is drained from the turbine brake 34 to the sump. The vehicle 1 is thus ready for driving, which is illustrated by an eighth step 58. The driver can regulate the desired drive torque by means of the accelerator pedal and can start off and drive the vehicle 1.

During gear engagement, the turbine shaft 21 has been stopped, which has meant that the input shaft 25 of the gearbox 6 has also been stationary. Gear engagements can therefore be carried out without additional requirements for any synchronisation arrangements in the gearbox 6. The gearbox 6 can therefore be of the so-called unsynchronised type, which means that it is both simple and inexpensive and can have small dimensions. Furthermore, during gear engagement, the turbine shaft 21 has been stopped while, in contrast, the pump shaft 18 has been driven by the engine 2. A deliberate slipping has therefore taken place in the torque converter 5 between the impeller 17 and the turbine wheel 19.

If, in the sixth step 56 above, there is no detection of thegear being engaged, the control unit 32 waits for this to occur. If no detection is obtained within a certain predetermined time T0, this is an indication that gear engagement cannot take place. This can be caused, for example, by the fact that the clutch members 31, which are included in the gearbox for ensuring engagement of the gear positions, have assumed rotational positions relative to each other which do not permit coupling together. The clutch members 31 of dimensionally fixed type, for example claw clutches, permit coupling together only when those parts which are to be coupled together are situated in certain relative rotational positions.

FIG. 3 shows that a time calculation is carried out in a ninth step 59, and if the time T in accordance with the above has exceeded the predetermined time T0, the control unit 32 emits a signal to interrupt engagement of the gear and instead to engage the neutral position of the gearbox 6. This is illustrated by a tenth step 60.

An eleventh step 61 involves detecting whether the gear is disengaged and, thus, whether the neutral position is engaged. If this is the case, the control unit 32, in a twelfth step 62, emits a signal to release the turbine brake 34. In this way, the impeller 17 in the torque converter 5 is able to drive the turbine wheel 19, with the result that the turbine shaft 21 begins to rotate. A thirteenth step 63 involves detecting whether the turbine shaft 21 is actually rotating. When the control unit 32 has received via the sensor 43 an indication that the turbine shaft 21 is rotating, i.e. that the turbine shaft speed $n_t$ is not equal to zero, a new attempt is made to engage the gear, which attempt is begun by once more activating the turbine brake 34. According to the flow diagram in FIG. 3, a return is made to the third step 53, after which the procedure described above is repeated. The rotation of the turbine shaft 21 and, thus, the rotation too of the input shaft 25 of the gearbox 6 has hopefully resulted in the clutch members 31 in the gearbox 6 having been rotated to relative positions which permit coupling together.

Depending on what is detected in the sixth step 56, either the gear engagement is completed or a new attempt at gear engagement is made.

If it is now assumed that gear engagement is completed, the driver can start the vehicle 1. He can regulate the desired drive torque in a conventional manner by means of the accelerator pedal. As the planetary gear brake 24 is disengaged, the drive torque of the engine 2 on the output shaft 10 is divided up in the planetary gear 4. Part of the torque is transmitted mechanically and part is transmitted hydraulically via the torque converter 5 to the input shaft 25 of the gearbox. Since in this way only part of the torque of the engine 2 passes via the torque converter 5, it is possible to dimension the planetary gear 4, the torque converter 5 and the first gear of the gearbox 6 in such a way that the vehicle 1 can reach a relatively high speed before gear-changing is again required. This speed is at least enough that the vehicle 1, upon the next shifting in the gearbox 6, does not risk coming to a halt during the subsequent gear-changing procedure. During the starting procedure described above, the torque converter 5 initially acts in a conventional manner as a torque amplifier. When the control unit 32 detects that the vehicle has reached a certain speed, a signal is emitted to the servo member 47 to activate the planetary gear brake 24. The sun wheel 15 is thus locked and its rotation stops. During this first gear-changing, a slipping initially takes place in the planetary gear brake 24 and this gear-changing takes place without drive power interruption, since no gear-changing is carried out in the gearbox 6. The planetary gear 4 thereafter acts as an overdrive gear since the speed of its first output shaft 14 is higher than the speed of the input shaft 11.

This too means that the vehicle 1, in accordance with the above, can reach a relatively high speed before the next change of gear is required, which gear-changing is carried out in the gearbox 6.

However, when there is a need to change up in order to further increase the speed of the vehicle, the changing-up takes place in the gearbox 6 automatically in accordance with the basic flow diagram shown in FIG. 4. Such a requirement can be detected by the control unit 32 with the aid of, inter alia, the speed sensors 42, 43 on the output shaft 26 and input shaft 25, respectively, of the gearbox 6, and signals from the engine control unit 46. In an initial step 71 it is assumed that the control unit 32 has detected a changing-up requirement. In a subsequent step 105, the control unit 32 emits a signal which activates the first solenoid valve 93, while the second solenoid valve 98 remains in its closed rest position 100. In this way oil is conveyed to the turbine brake 34. However, oil is also conveyed via the line 97 to the pressure-regulating valve 99 in which the connection with the return line 102 is opened. The oil pressure conveyed to the brake 34 can therefore only reach a low value in accordance with what has been described previously. This low oil pressure is thus intended to take up play between the discs of the brake and to bring together the discs at a low pressure. In the next step 72, the control unit 32 emits signals to the engine control unit 46 in order to regulate the torque M of the engine 2 to zero. Such a reduction of the engine torque advantageously takes place in accordance with a predetermined ramp function. The following step 73 involves detecting whether the engine torque M is equal to zero, or is sufficiently near zero with regard to possible tolerances. If this is the case, in the next step 74 the control unit 32 emits a signal to the servo member 33 of the gearbox 6 to disengage the gear which is engaged and to engage instead the neutral position. The following step 75 involves detecting whether this has taken place, and, if the gear is disengaged, the control unit 32 in a step 76 emits a signal to activate the second solenoid valve 98 so that this assumes its open position 101. In this way, oil is also conveyed to the pressure-regulating valve 99 and displaces the piston 113 to its right-hand end position so that the connection of the line 97 to the return line 102 is interrupted. The oil which is conveyed to the brake 34 therefore reaches a high pressure, which is sufficient for the discs of the brake 34 to be able to carry out braking work in order to reduce the rotational speed of the input shaft 25 of the gearbox.

Since, in the previous step 105, the brake was applied at a low pressure, the activation of the brake in step 76 can be effected quickly, with the result that braking of the input shaft is also effected quickly. This means that the time for a changing-up procedure can be quick, and the time in which the gear-changing causes drive power interruption can be reduced. In order to reduce the speed of the turbine shaft 21 even more quickly, the control unit 32 also emits a signal to the engine control member 46 in order to activate an engine brake function in a step 77. This engine brake function can be achieved in practice by the throttle of the engine 2 being closed and/or by suitable regulation of its fuel injection. In those cases where the engine 2 is additionally equipped with a so-called exhaust brake, this brake can also advantageously be designed to be activated by the control unit at the same time as the engine brake function, in order to retard the engine shaft 10 even more quickly.

When the engine speed $n_m$ has dropped to or fallen below a predetermined speed NO for each gear position in accordance with step 78, the control unit 32 in step 79 emits a signal to release the turbine brake 34. In addition, the control unit 32 in a step 80 emits a signal to the engine control unit 46 which regulates the engine speed $n_m$ to a speed corresponding to a synchronous speed $n_s$ in the gearbox 6 for the gear which is to be engaged. It is assumed in this respect that the control unit 32 includes a memory unit in which values are stored for the different gear changes which are possible for the gearbox 6. With the aid of these values, the synchronous speed $n_s$ for each gear can be calculated as a function of the actual speed of the output shaft 39 of the gearbox 6. This control of the engine speed $n_m$ is achieved in practice by regulating the throttle of the engine and/or the fuel injection.

When the engine speed $n_m$ has assumed the synchronous speed $n_s$ or, with regard to tolerances, is considered to be sufficiently near this, as illustrated by step 81, the control unit 32 emits signals to the servo member 33 of the gearbox 6 in order to engage the new gear in question, illustrated by step 82. Step 83 involves detecting whether the gear is actually engaged and, if this is the case, the changing-up is complete, as illustrated by step 84. By means of the accelerator pedal, the driver can then regulate the torque of the engine 2 and the speed at which the vehicle 1 is to be driven.

During the changing-up procedure described, the engine 2 has been controlled entirely by means of signals from the control unit 32. The activation of the accelerator pedal by the driver during the gear-changing procedure has therefore not affected the engine control. The transition between the automatic regulation of the engine control by the control unit 32 and the regulation by the driver via the accelerator pedal should take place in accordance with a certain ramp function so that driving will be free from jolts. Further changing-up in the gearbox 6 takes place in a completely analogous manner to what has been described above with reference to FIG. 4. During all gear-changes carried out in the gearbox 6, the planetary gear 4 is in its high gear position, i.e. the planetary gear 4 acts as an overdrive gear and the torque converter 5 does not contribute to the torque transfer in the transmission.

If, on the basis of the vehicle parameters sensed, the control unit 32 detects a requirement for changing-down, this is carried out in accordance with a procedure rather like that which is initiated on changing-up. When changing-down, however, it is instead necessary to accelerate the input shaft 25 of the gearbox 6 before a new gear is engaged. The flow diagram shown in FIG. 4 is also applicable to changing-down as regards steps 72 to 75.

In contrast, in step 76 the turbine brake will not be activated. Likewise, in step 77, the engine 2 will not be controlled by an engine brake function, but instead the engine 2 will be controlled in such a way that its speed increases. When the speed of the engine 2 exceeds a certain speed, the engine 2 is controlled to a synchronous speed in the same way as in step 80. Thereafter, the procedure is the same as in steps 81 to 84.

When changing down to lowest gear, the starting gear, when the first gear position of the stepped gearbox and the low gear range of the planetary gear are engaged, the control unit 32 also emits signals for regulating the planetary gear brake 24 in a manner analogous to that described previously. Should the vehicle 1 be braked quickly, the changing-down takes place in such a way that the starting gear is engaged before the vehicle 1 is completely stationary. As has been described above, when the vehicle is stationary, the impeller 17 of the torque converter 5 is driven, while its turbine wheel 19 is stationary.

Engagement of the reverse gear of the gearbox 6 is effected in a manner analogous to that which has been described above for engagement of the starting gear. Since, at least as regards vehicles for road traffic, there is only a limited requirement for reversing the vehicle, there is no need to disengage the torque converter 5 during reversing. Only the reverse gear and the first gear in the gearbox 6 must be dimensioned for the increased torques which can occur on account of the torque increase of the torque converter 5. The other gears in the gearbox 6 need only be dimensioned on the basis of the torques which the engine 2 is able to provide via the planetary gear 4. Since the planetary gear 4 in these cases acts as an overdrive gear, the torque from the engine 2 is reduced before it is transmitted to the input shaft 25 of the gearbox 6.

An important advantage obtained in an advantageous embodiment of the present invention is that there is no need at all for any separate clutch in order to create drive power interruption between the engine 2 and the gearbox 6 during the time in which gear-changing is taking place in the gearbox 6. During gear-changing in the gearbox 6, a drive power interruption is obtained in the transmission 3. If in this respect the speed of the vehicle were to be too low, there would be a risk of the vehicle, for example a heavily loaded vehicle on an uphill incline, coming to a halt before a new gear was engaged. However, since the planetary gear 4 according to the illustrated advantageous embodiment and the torque converter 5 allow the vehicle 1 to reach a comparatively high speed before there is a need for changing up in the gearbox 6, it has been possible for this risk to be eliminated at least under the most common driving conditions. Should the vehicle 1 unexpectedly have stopped or its speed have been reduced during the gear-changing procedure, the starting gear is automatically engaged and driving can be immediately resumed or continued at low speed.

Gearboxes for heavy vehicles often comprises a so-called range section with a low-speed range and a high-speed range. The transmission according to the invention dispenses with the need to change gear in the low-speed range, and the need for a range gearbox is therefore also dispersed with. This affords great advantages.

Since there is no need for separate coupling, it has been possible for the gear-changing procedure to be automated by simple means. Since the activation of the turbine brake 34 upon changing-up takes place in two steps, the time for the gear-changing procedure itself has been reduced, and similarly the time in which the gearbox produces drive power interruption. The risk of the vehicle 1 coming to a halt during a gear-changing procedure is therefore smaller than in those cases where the driver is forced to manoeuvre a clutch.

Various attempts have been made, particularly in heavy vehicles, to automate the manoeuvring of a conventional dry plate clutch in order thereby to automate the whole gear-changing procedure using a side-shaft gearbox. For lorries which are driven alternately without any load and with a full load, this problem means that the slipping-in of the clutch must be regulated with regard to the load. This means that extremely advanced and complicated control systems are necessary for regulating the clutch work. According to the present invention, the need for such a clutch is completely dispensed with, as is the need for any control system for the clutch. This facilitates the automation of the gear-changing procedure.

In normal driving, the low-speed range of the planetary gear 4 and, thus, also the torque converter 5 are only coupled-in during the starting procedure. This means that the disadvantages associated with the relatively poor efficiency of the torque converter 5 apply only during a limited time. Since driving in other gears can be effected completely mechanically and with a stepped gearbox 6 of the unsynchronised type, a gearbox is obtained which is both inexpensive to manufacture and has low friction losses. The free wheel 20 of the torque converter 5 prevents the turbine wheel 19 from being driven by the turbine shaft when the torque converter is disengaged, which otherwise would cause friction losses in the torque converter 5.

The turbine brake 34 can also be used together with the ordinary brake system of the vehicle 1 in order to improve the braking capacity of the vehicle. In such cases, the control unit 32 obtains a signal from the brake pedal sensor 40 indicating that a braking procedure is ongoing, and the control unit 32 can emit a new signal to activate the turbine brake 34.

The method described has related primarily to a normal driving procedure. The control unit 32 can additionally be designed to regulate the transmission, using signals other than have been mentioned, for detecting errors in the system or the occurrence of abnormal driving situations.

The invention can be modified within the scope of the attached patent claims and can be designed in a manner other than that which has been illustrated in the above description.

We claim:

1. A transmission for a vehicle, said transmission comprising:
   a stepped gear box having an input shaft and an output shaft and a plurality of shiftable gear wheels coupled therebetween;
   a hydrodynamic torque converter having an input for receiving driving power from a power source and an output shaft, said output shaft of said torque converter being coupled in a drive power transmitting relationship to said input shaft of said stepped gear box;
   said torque converted including a turbine wheel which is connected in a drive power transmitting relationship to said output shaft of said torque converter via a free wheel;
   a brake connected to at least one of said output shaft of said torque converter and said input shaft of said stepped gear box; and
   an electrical control unit for controlling both gear shifting operations of said stepped gear box and the operation of said brake, said electrical control unit causing said brake to stop the rotation of said stepped gear box input shaft when a gear change operation is to take place in said stepped gear box.

2. A transmission according to claim 1, wherein said stepped gear box includes a plurality of pairs of gear wheels, said gear wheels being disposed respectively on a main shaft and at least one side shaft, said gear wheels having a plurality of different gear ratios, said pairs of gear wheels being selectively engaged by means of dimensionally fixed clutch members.

3. A transmission according to claim 2, wherein said electrical control unit controls said gear changing operations of said stepped gear box by causing said fixed clutch members to selectively engage respective pairs of said gear wheels.

4. A transmission according to claim 1, wherein said brake includes electrohydraulic servo members whose operation are controlled by said electrical control unit.

5. A transmission according to claim 4, wherein said electrical control unit causes said brake to stop the rotation of said stepped gear box input shaft before said electrical control unit shifts said gear box from a neutral position to a starting gear position.

6. A transmission according to claim 4, wherein said electrical control unit controls said electrohydraulic servo members of said brake, said brake is activated first by taking up mechanical play in the brake without applying braking power to said at least one of said output shaft of said torque converter and said input shaft of said stepped gear box and then by subsequently applying braking power to said at least one of said output shaft of said torque converter and said input shaft of said stepped gear box.

7. A transmission according to claim 1, further comprising a planetary gear having an input coupled to said power source and a pair of outputs, one of said outputs being coupled to said input of said hydrodynamic torque converter, the other of said outputs being coupled to said input shaft of said stepped gear box, said planetary gear dividing the drive torque applied to its input into a first part which is transmitted hydraulically via said torque converter to said input shaft of said stepped gear box and a second part which is transmitted mechanically to said input shaft of said stepped gear box.

8. A transmission according to claim 7, wherein said planetary gear comprises:
   a planetary wheel connected to said input of said planetary gear;
   a sun wheel connected in a drive power transmitting relationship to said input of said hydraulic torque converter;
   a ring wheel mechanically connected in a drive power transmitting relationship to said stepped gear box input shaft whereby said planetary gear transmits power to said stepped gear box in two parts, one of said parts being transmitted hydraulically to said stepped gear box via said torque converter, the other of said parts being transmitted to said stepped gear box input shaft through direct mechanical connection.

9. A transmission according to claim 8, wherein said sun wheel is connected to a second brake, said second brake being selectively controlled by said electronic control unit to selectively prevent rotation of said sun wheel at which time all of torque from said planetary gear input shaft is transmitted mechanically to said stepped gear box input shaft and said planetary gear acts as an overdrive gear.

10. A transmission according to claim 1, wherein said transmission does not include any mechanical plate clutch for interrupting the application of the drive power from said power source to said stepped gear box during said gear changing operations.

11. A transmission according to claim 1, wherein said electrical control unit includes means for detecting that a drive mode selector has been placed in a drive mode, and said electrical control unit controls:
   means for preventing rotation of said input shaft of said stepped gear box;
   means for engaging a starting gear in said stepped gear box; and
   means for releasing said input shaft of said stepped gear box so as to permit said input shaft to rotate.

12. A transmission according to claim 11, wherein said electrical control unit includes means for activating said brake in order to prevent the rotation of said input shaft of said stepped gear box comprising:
   means for causing said brake to take up mechanical slack without actually preventing rotation of said input shaft of said stepped gear box after said electrical control unit has detected that a drive mode selector has been placed in a drive mode; and
   means for causing said brake to actually prevent rotation of said input shaft of said stepped gear box only after said electrical control unit has determined that either no gear is engaged in the stepped gear box, or that the gear box is in a neutral position.

13. A transmission for a vehicle, said transmission comprising:
   a stepped gear box having an input shaft and an output shaft and a plurality of shiftable gear wheels coupled therebetween;
   a hydrodynamic torque converter having an input shaft for receiving driving power from a power source and an output shaft, said output shaft of said torque converter being coupled in a drive power transmitting relationship to said input shaft of said stepped gear box;
   an electrical control unit for controlling both gear shifting operations of said stepped gear box and the operation of a hydraulic disc brake, said electrical control unit causing said brake to stop the rotation of said stepped gear box input shaft when a gear change operation is to take place in said stepped gear box;
   said brake being connected for braking at least one of said output shaft of said torque converter and said input shaft of said stepped gear box, and said brake being supplied with a hydraulic fluid upon activation and having electrohydraulic servo members, each comprising two solenoid valves connected to and operated by said electrical control unit, one of said solenoid valves determining whether or not said hydraulic fluid is applied to said disc brake, the other of said solenoid valves controlling the pressure at which said hydraulic fluid is applied to said hydraulic disc brake.

14. A transmission according to claim 13, wherein said brake is activated first by applying a low pressure taking up mechanical play in the brake without applying braking power, and then by subsequently applying a high pressure, thereby causing said brake to apply braking power.

15. A transmission according to claim 14, wherein said low pressure is less than one bar and said high pressure is at least five bars.

16. A transmission according to claim 13, wherein said brake includes a disc firmly connected to at least one of said output shaft of said torque converter and said input shaft of said stepped gear box, and two opposing calipers, and when said electrical control unit controls said solenoid valves, said hydraulic fluid is first applied to said brake at a relatively low pressure to take up slack between said two calipers and said disc, and is then applied to said brake at a relatively high pressure to force said two calipers into braking contact with said disc.

17. A transmission for a vehicle, said transmission comprising:
- a stepped gear box having an input shaft and an output shaft and a plurality of shiftable gear wheels coupled therebetween;
- a hydrodynamic torque converter having an input shaft for receiving driving power from a power source and an output shaft, said output shaft of said torque converter being coupled in a drive power transmitting relationship to said input shaft of said stepped gear box;
- a brake connected to at least one of said output shaft of said torque converter and said input shaft of said stepped gear box;
- an electrical control unit for controlling both gear shifting operations of said stepped gear box and the operation of said brake, said electrical control unit causing said brake to stop the rotation of said stepped gear box input shaft when a gear change operation is to take place in said stepped gear box; and
- a planetary gear having an input coupled to said power source and a pair of outputs, one of said outputs being coupled to said input of said hydrodynamic torque converter, the other of said outputs being coupled to said input shaft of said stepped gear box, said planetary gear dividing the drive torque applied to its input into a first part which is transmitted hydraulically via said torque converter to said input shaft of said stepped gear box and a second part which is transmitted mechanically to said input shaft of said stepped gear box.

18. A transmission according to claim 17, wherein said planetary gear comprises:
- a planetary wheel connected to said input of said planetary gear;
- a sun wheel connected in a drive power transmitting relationship to said input of said hydraulic torque converter;
- a ring wheel mechanically connected in a drive power transmitting relationship to said stepped gear box input shaft whereby said planetary gear transmits power to said stepped gear box in two parts, one of said parts being transmitted hydraulically to said stepped gear box via said torque converter, the other of said parts being transmitted to said stepped gear box input shaft through direct mechanical connection 19. A transmission according to claim 18, wherein said sun wheel is connected to a second brake, said second brake being selectively controlled by said electronic control unit to selectively prevent rotation of said sun wheel, at which time all of the torque from said planetary gear input shaft is transmitted mechanically to said stepped gear box input shaft, and said planetary gear acts as an overdrive gear.

20. A method for operating the transmission of a vehicle of the type which includes a stepped gear box having an input shaft and an output shaft and a plurality of shiftable gear wheels coupled therebetween;
- a hydrodynamic torque converter having an input for receiving driving power from a power source and an output shaft, said output shaft of said torque converter being coupled in a drive power transmitting relationship to said input shaft of said stepped gear box; said torque converter includes a turbine wheel which is connected in a drive power transmitting relationship to said output shaft of said torque converter via a free wheel; and
- a brake connected to at least one of said output shaft of said torque converter and said input shaft of said stepped gear box, said method comprising the steps of:
- determining when a gear changing operation is to take place in said stepped gear box; and
- causing said brake to stop said stepped gear box input shaft when a gear changing operation is to take place in said stepped gear box.

21. The method of claim 20, wherein said stepped gear box includes a plurality of pairs of gear wheels, said gear wheels being disposed respectively on a main shaft and at least one side shaft, said pairs of gear wheels being selectively engaged by means of dimensionally fixed clutch members, and wherein said method further comprises the step of causing a gear changing operation to take place in said stepped gear box by causing said fixed clutch members to selectively engage respective pairs of said gear wheels.

22. A method according to claim 20, wherein said brake includes electrohydraulic servo member, and wherein said step of causing said brake to stop the rotation of said stepped gear box input shaft comprises the steps of:
- taking up mechanical play in the brake without applying braking power to said at least one of said output shaft of said torque converter and said input shaft of said stepped gear box; and thereafter
- applying braking power to said at least one of said output shaft of said torque converter and said input shaft of said stepped gear box.

23. A method according to claim 22, wherein said brake is a hydraulic disc brake including first and second opposing calipers, and a disc firmly connected to at least one of said output of said torque converter and said input shaft of said stepped gear box, and wherein said step of causing said brake to stop the rotation of said stepped gear box input shaft comprises the steps of:
- applying hydraulic fluid to said disc brake at a relatively low pressure so as to take up slack between said two calipers; and thereafter
- applying hydraulic fluid to said disc brake at a relatively high pressure so as to force said two calipers into braking contact with said disc.

24. A method according to claim 23, wherein said low pressure is less than one bar and said high pressure is at least five bars.

25. A method according to claim 23, wherein said gear shifting apparatus operations of said stepped gear box are carried out by:
- detecting that a drive mode selector has been placed in a drive mode;
- activating said brake in order to prevent rotation of said input shaft of said stepped gear box;
- engaging a starting gear in said stepped gear box; and
- causing said brake to release said input shaft of said stepped gear box so as to permit said input shaft to rotate.

26. A method according to claim 25, wherein said electrical control unit activates said brake in order to prevent the rotation of said input shaft of said stepped gear box by;

first causing said brake to take up mechanical slack without actually prevent rotation of said input shaft of said stepped gear box after said electrical control unit has detected that a drive mode selector has been placed in a drive mode; and thereafter causing said brake to actually prevent rotation of said input shaft of said stepped gear box only after said electrical control unit has determined that either no gear is engaged in the stepped gear box, or that the gear box is in a neutral position.

* * * * *